United States Patent Office 3,054,196
Patented Sept. 18, 1962

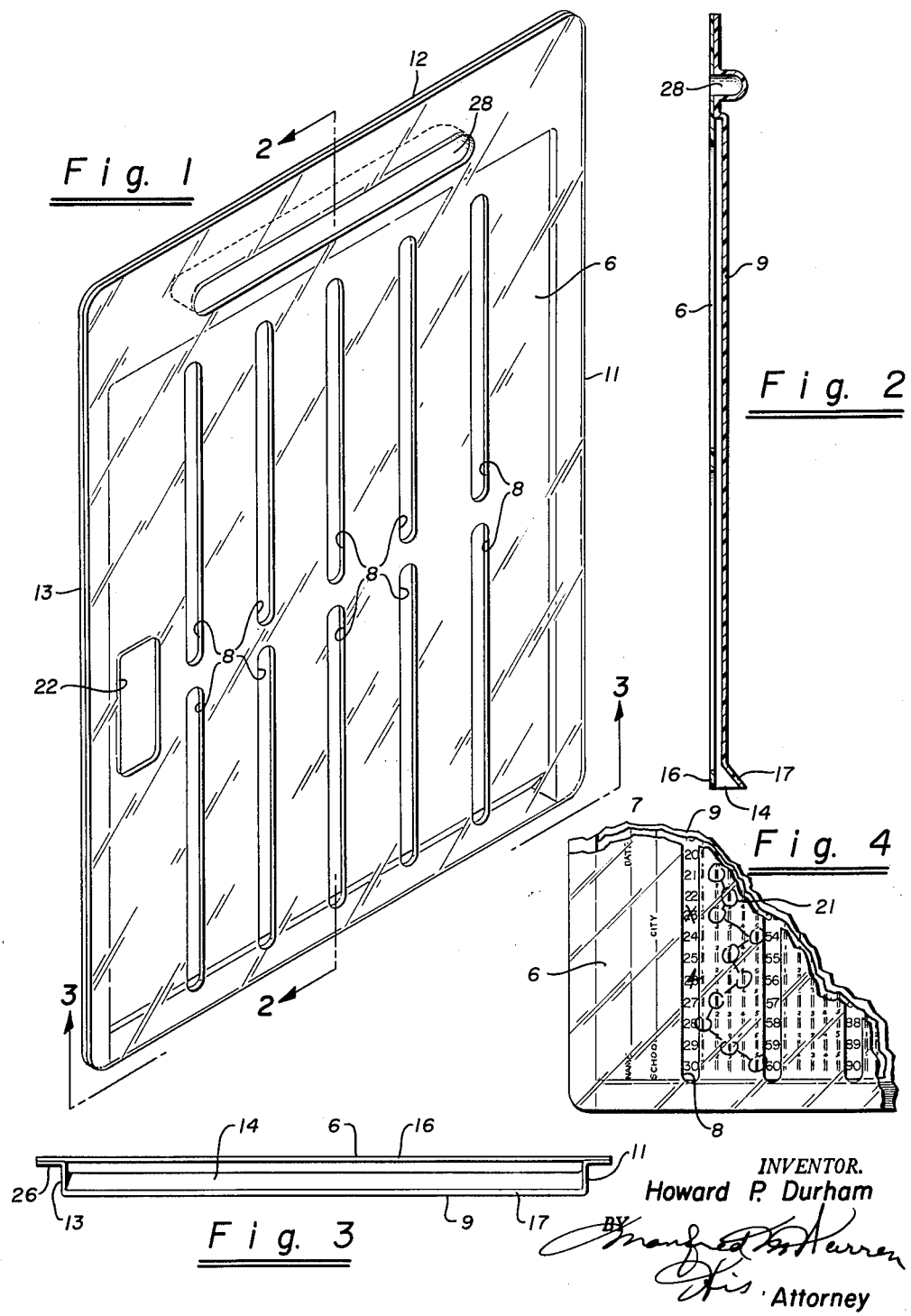

3,054,196
TEST GRADING DEVICE
Howard P. Durham, Stanford Village, Calif.
(1234 Sessame Court, Sunnyvale, Calif.)
Filed May 2, 1960, Ser. No. 25,975
3 Claims. (Cl. 35—48)

The invention relates to educational aids and more particularly to test grading machines used for scoring standardized sheets having a pre-arranged distribution of answer spaces thereon.

An object of the present invention is to provide a test grading device of the character described which is of a simple low-cost portable manual type, and which will enable the teacher or grader to quickly and easily score a relatively large number of test sheets more accurately and more completely than customary machine grading.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing (one sheet):

FIGURE 1 is a perspective view of a test grading device constructed in accordance with the present invention.

FIGURE 2 is a cross-sectional view of the device taken substantially on the plane of line 2—2 of FIGURE 1.

FIGURE 3 is a bottom or edge view as suggested by line 3—3 of FIGURE 1.

FIGURE 4 is a fragmentary front elevation of a portion of the device with an examination sheet inserted therein.

The test grading device of the present invention is designed for used with popular common styles of printed test sheets having a pre-determined distribution of answer spaces thereon and consists briefly of a transparent cover member 6 and means holding a test sheet, such as sheet 7, in position thereunder, as illustrated in FIGURE 4, the cover member being formed with a plurality of openings 8 therethrough correlated with the predetermined distribution of answer spaces on the test sheet for marking answer correcting information directly upon the underlying test sheet 7. Preferably the device is constructed of a box-like frame enclosure having opposed relatively rigid bottom member 9 and cover member 6 spaced to receive therebetween a stack of test sheets 7 and having peripheral sides 11 12 and 13 holding the stack of sheets in fixed registration under the cover member 6. Preferably the enclosure is open at one end or peripheral edge 14 for passing of the test sheets therethrough into and out of the enclosure, and to facilitate this operation the opposed portions 16 and 17 of the bottom and cover members at the open peripheral edge 14, see FIGURES 3 and 4, are formed to provide a tapered entry slot for the sheets. This is effected by forming portion 17 to extend divergently away from portion 16 in the direction of the open end 14.

Various standard styles of test sheets are in popular use. The present device has been designed for use with forms produced by International Business Machines under numbers 151, 167, 444, 445, 542, 1552 and others, and particularly test sheets having answer spaces thereon arranged in a pre-determined distribution of rows and columns. Accordingly the transparent cover member 6 of the present device is preferably formed as here illustrated with the openings 8 therein arranged as columnar slots which are correlated with the columnar distribution of answer spaces such as illustrated in FIGURE 4. Of course, other arrangements of openings and/or slots in in the top 6 may be used to accommodate other question and answer arrangements.

In the style of test sheet illustrated, the sheet is printed with columns of numbers, see numbers 20–30, 54–60, and 88–90 in FIGURE 4 corresponding to the questions asked. In each case five possible answers may be indicated by the student by marking between pairs of lines labeled 1, 2, 3, 4, and 5 positioned to the right hand side of each of these question numbers. The correct answers are written by the teacher or grader on the transparent cover member 6 so that the correct answers and the given answers may be immediately compared and the sheet scored. This correct answer information may be removably applied to the cover 6 as by means of a grease pencil with the correct answers circled and connected as indicated at 21 in FIGURE 4. In the illustration there depicted correct answers appear at a glance for questions 21, 22, 24, 25, 27, 28, 29 and 30; and incorrect answers are equally apparent in the case of answers to questions 23 and 26. The teacher has the option of simply marking a question wrong by placing a cross of "X" through the question number as in the case of question No. 23, or the teacher can call the student's attention to the correct answer while also marking the answer wrong by writing the correct answer number such as "4" over the question No. 26 as illustrated. In either case the grading information such as the cross or the number 4 may be written with an ordinary lead pencil or pen onto the test sheet 7 through the open slot 8.

Another and somewhat larger opening 22 is provided in the cover member 6 and which is positioned to one side as illustrated so as to overlie the portion of the printed test sheet customarily reserved for entry of the ultimate score or test grade. After grading of the individual questions as above, the teacher may enter the grade or score to the underlying test sheet by inserting a pencil or pen through opening 22. This opening is also sufficiently large for passing a finger of the user therethrough for manual engagement with the uppermost sheet of the stack for sliding out of the top graded sheet on completion of the grading operation.

As will be observed from the foregoing the use of the grading device of the present invention will not only permit the rapid grading of examinations and the writing in of the ultimate score, but will also show the students the questions which they missed, a feature not usually obtainable in the scoring of the sheets by means of the common electronic scoring machines. Similarly, the present device in contra-distinction to the electronic machines permits the teacher to evaluate the test and to cover in subsequent lectures material which a large number of students may have missed on the test, and also to turn up questions which were improperly included in the examination. In other words, the reliability of a test can only be measured by knowing the questions which were missed; and as a further feature of reliability the test papers never need leave the possession of the teacher with the use of the present device. Electronic machines require the use of special marking pencils whereas any clear marking is satisfactory with the present device. Also the present device will show up the situation where a student is guessing by filling in a plurality of answers to a single question. Instead of using a grease pencil to lay out the pattern of correct answers, such pattern could be screened or printed directly upon the top of the device for standardized intelligence, interest or aptitude tests which are given in volume, or transparent sheet could be overlaid on the top.

Another use of the device is for tabulating results of inquiries to questions as for example, in the making of telephone or other surveys and the device can be used with test sheets which require short written answers as well as mere marking of correct answers, as illustrated.

Short answer questions may be graded by writing the correct answer on the top. Similarly the top 6 may be marked for grading of questions having several correct, but weighted differently, answers. Another use of the device by the teacher is to determine the frequency of incorrect answers in a given test by putting the corrected papers back into the device and placing a check mark opposite each question missed.

The cover and bottom members 6 and 9 may be formed of any convenient sheets of rigid material, such as thermoplastic. As here shown, the bottom sheet 9 is formed dish-shaped so as to provide the peripheral walls and interior clear space, and the cover member 6 is cemented, heat-sealed or otherwise secured to peripheral flange portions 26, on the bottom member 9, see FIGURE 3. Also conveniently, the bottom member 9 may be formed with a recess 28 which registers with an opening through the cover sheet 6 so as to define a cavity or holder for a grease pencil used with the device.

I claim:

1. A grading combination comprising, a test sheet having a column of numbers representing multiple choice questions and a series of designated markable stations opposite each of said numbers and representing responses, the person taking the test marking at least one of said stations for each question answered, a transparent cover sheet dimensioned for mounting over and in registration with said test sheet and having an area overlying said stations formed for placing thereon erasable markings in direct overlying relation to the correct answer stations on said test sheet whereby instantaneous visual grading may be obtained by the sole test of visual registration of said erasable markings and said marked stations, said cover sheet being formed with a columnar slot contiguous to said area and overlying and registering with said column of numbers for enabling the grader to project a writing instrument through said slot for marking on said test sheet grading information directly upon the number of the question being graded.

2. A grading combination as characterized in claim 1 wherein said cover sheet forms the top member of a relatively rigid box like enclosure having an opposed bottom member spaced to receive therebetween a stack of said test sheets and having peripheral sides holding said sheets in fixed registration under said top member, said enclosure being open at one peripheral edge for passing said sheet therethrough into and out of said enclosure.

3. A grading combination as characterized in claim 2 wherein the opposed portions of said bottom and top members at said open peripheral edge are formed to provide a tapered entry slot for said test sheets, and said top member is formed with an opening dimensioned for passing a finger of a grader therethrough for manual engagement and sliding out through said open end of a graded uppermost sheet.

References Cited in the file of this patent

UNITED STATES PATENTS

| | | |
|---|---|---|
| 1,915,653 | Dutton | June 27, 1933 |
| 2,165,613 | Conn | July 11, 1939 |
| 2,333,597 | Strauss | Nov. 2, 1943 |
| 2,340,251 | Nesbit | Jan. 25, 1944 |
| 2,503,130 | Poritz | Apr. 4, 1950 |
| 2,835,989 | Arrowsmith | May 27, 1958 |
| 2,977,689 | Rugland | Apr. 4, 1961 |

FOREIGN PATENTS

| | | |
|---|---|---|
| 485,701 | Great Britain | May 24, 1938 |